United States Patent
Kempema et al.

[15] 3,697,731
[45] Oct. 10, 1972

[54] METHOD AND APPARATUS FOR DETERMINING MAXIMUM ALLOWABLE JET ENGINE PRESSURE RATIOS

[72] Inventors: James L. Kempema, Grandville; Ralph W. Foard, Grand Rapids, both of Mich.

[73] Assignee: Lear Siegler, Inc.

[22] Filed: Feb. 17, 1969

[21] Appl. No.: 799,810

[52] U.S. Cl. ............235/150.2, 235/150.21, 73/116
[51] Int. Cl. .........................G06g 7/70, G01l 5/13
[58] Field of Search ........73/116; 235/150.2, 150.21, 235/150.22

[56] References Cited

UNITED STATES PATENTS

| | | | |
|---|---|---|---|
| 3,233,451 | 2/1966 | Russ | 235/150.2 X |
| 3,238,768 | 3/1966 | Richardson | 235/150.2 X |
| 3,272,004 | 9/1966 | Haverl | 235/150.2 X |
| 3,465,579 | 9/1969 | Cason | 235/150.2 X |

*Primary Examiner*—Eugene G. Botz
*Assistant Examiner*—Edward J. Wise
*Attorney*—Wilfred O. Schmidt

[57] ABSTRACT

An instrument comprised of inputs for receiving signals proportional to aircraft pressure altitude and compressor inlet temperature, which are coupled to function generators that produce outputs respectively representative of maximum engine pressure ratio at such altitude and at such temperature conditions, comparator means for receiving the functions so generated and selecting the one representative of the lowest allowable engine pressure ratio at such conditions, and a servo drive for a visual readout display of maximum engine pressure ratio. The instrument also includes system inputs for modifying the result to be displayed, in accordance with different flight modes of the aircraft, and also in accordance with compressor bleed air tapped from the engine for use in auxiliary aircraft systems.

9 Claims, 1 Drawing Figure

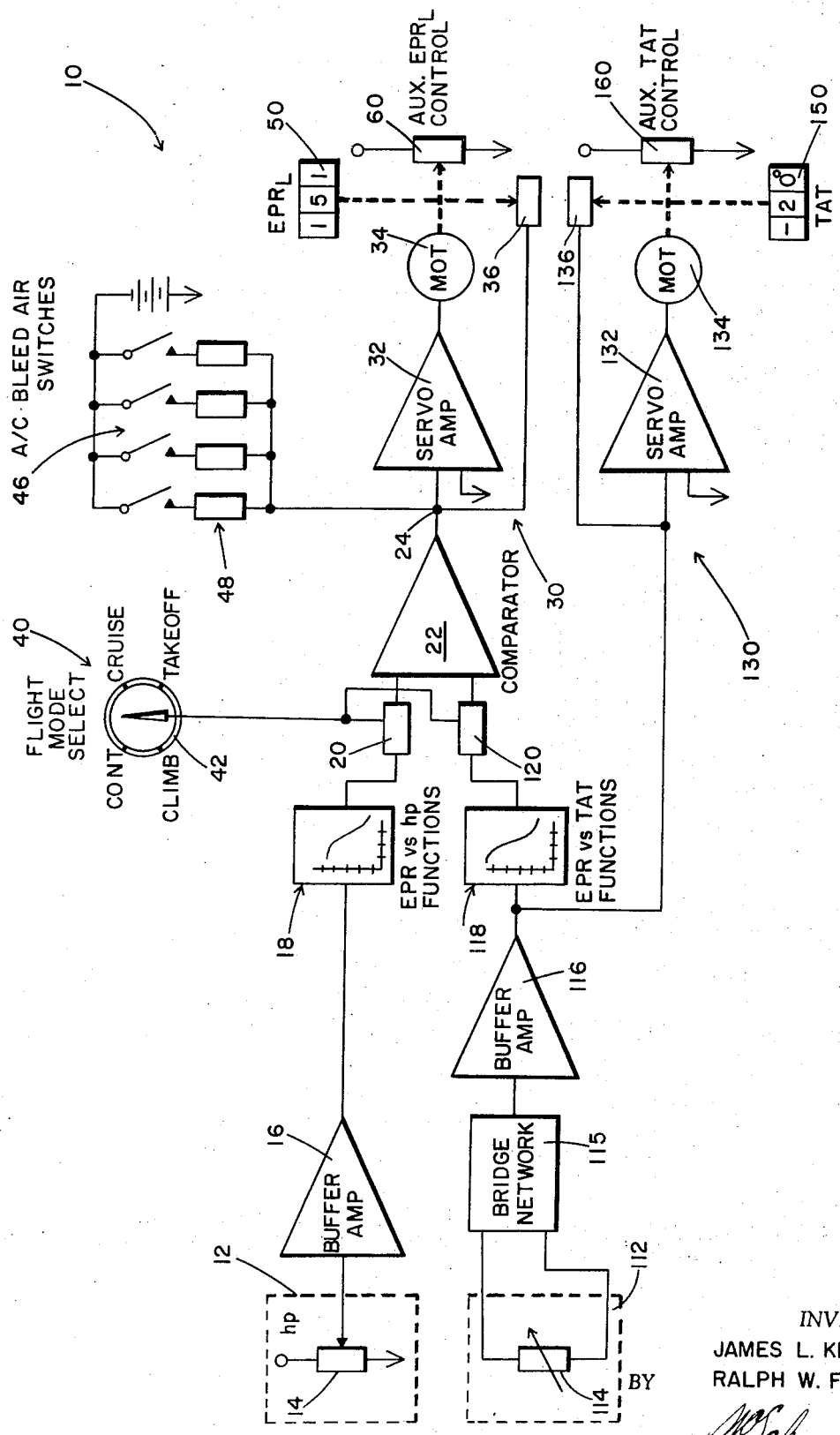

METHOD AND APPARATUS FOR DETERMINING MAXIMUM ALLOWABLE JET ENGINE PRESSURE RATIOS

BACKGROUND

While jet engine performance is for the most part generally thought about in terms of thrust output, actual thrust is an illusive and difficult parameter to measure, particularly under conditions of typical use or application, and the concept of engine pressure ratio (EPR) has long been used as an indication and a measure of engine thrust output. As is well known, EPR is generally defined as the ratio of total turbine discharge pressure divided by total engine inlet pressure; however, under conditions of operation in an aircraft, the maximum allowable or certified EPR is a function of the flight mode (i.e., takeoff or go-around, continuous flight, climb, cruise) and the instantaneous conditions of both pressure altitude and compressor inlet temperature. Actually, separate maximum allowable EPR figures will exist for a particular engine in a particular airframe under a given flight mode for both a particular pressure environment and a particular temperature environment, and the engine must be maintained at an actual EPR which does not exceed the lowest of these two figures.

The continuous and instantaneous control of engine output in accordance with the aforementioned parameters has always been a matter of considerable trouble. Actual EPR at any given moment is available from a cockpit instrument which uses sensed engine pressures as the source of its inputs; as stated previously, however, the maximum allowable EPR is something quite different from the actual EPR, which must be limited and controlled to prevent structural damage to the engine, such as material "creep," metal fatigue, etc. While engine thrust (or EPR) control is thus a matter of extreme importance, this has previously been accomplished in only a very rudimentary and painstaking manual sort of way. Engine manufacturers have provided charts showing rated or certified maximum EPR's for different examples of pressure and temperature environment for each of the different flight modes as well as airframes, and these charts are used by the flight engineer or other crew officer in a cumbersome and inherently inaccurate process for estimating approximate maximum EPR. In such process, a number of personal or individual decisions and estimations are required and, because the estimated maximum EPR finally arrived at is actually appropriate only for an altitude and temperature environment condition which existed several moments prior, the EPR limit which has been determined is inevitably erroneous, particularly in rapidly changing modes of flight such as takeoff or go-around. Quite clearly, the speed and altitudes of which modern aircraft are capable necessitate a much different and much better method and instrumentation for determining this extremely important criterion for jet engine operation.

THE PRESENT INVENTION

The present invention provides the answer to the need just defined, in the form of a modern method and instrumentation which continuously monitors instantaneously changing flight parameters and steadily displays an accurate and instantaneous visual readout of maximum EPR for the particular flight mode of the aircraft. Inasmuch as the aircraft will normally have an instrumented readout of actual EPR, it thus becomes a simple matter for the pilot to maintain a surveillance between the instrument of the invention, showing maximum allowable EPR, and the cockpit instrument showing actual EPR, and adjust his thrust setting so that the latter never exceeds the former. In this manner, maximum engine performance may be utilized at all times, but without exceeding performance limitations, thereby augmenting the safety factor of continuous operation, maximizing the efficiency of operation, minimizing maintenance and repair expense while extending engine life and, quite importantly, relieving a crew member of a demanding and somewhat frustrating task during those moments in flight when his attention is needed for other duties.

Briefly stated, the instrument of the invention comprises an electronic device having inputs for receiving signals respectively proportional to pressure altitude and compressor inlet temperature environments, function generation means for receiving such inputs and producing signals which are respective functions of the inputs and the established maximum EPR ratings for the input conditions of altitude and temperature, a comparator means for receiving the outputs from the function generator and selecting the one thereof representative of the lowest allowable maximum EPR, and a servo-driven visual readout display for indicating to the pilot or crew the maximum allowable EPR under the instantaneously-changing conditions.

IN THE DRAWINGS

The single FIGURE is a schematic block diagram illustrating the system of the invention.

PREFERRED EMBODIMENT

In the illustrated system 10 of the invention, an input means 12 is provided for monitoring the pressure altitude environment of the aircraft, and an input means 112 is provided for monitoring the engine ram air temperature environment. More specifically, means 12 is represented as a potentiometer 14 for providing an output from existing altitude instrumentation in the conventional aircraft air data computer. The proportional electrical signal so generated is coupled to a buffer or isolation amplifier 16, and thence to a function generator means 18, where a signal is produced which IS THE MAXIMUM EPR function for the particular altitude represented by the input signal. This function is, in turn, coupled through an appropriate logic and gating matrix 20, to a comparator 22, for purposes to be stated subsequently.

The input means 112 is represented as being a temperature-sensitive resistor 114 which physically is located in a ram air probe near the engine compressor inlet, and which is electrically coupled into a bridge network 115, so that the output from the bridge constitutes an electrical signal proportional to the inlet air temperature of the engine, normally referred to as "total air temperature," and abbreviated "TAT." This proportional signal is fed to its own buffer or isolation amplifier 116, and the amplified signal is coupled to both a temperature function generation means 118 and to a TAT display and driver, collectively designated 130. Function generator means 118 produces an output signal representative of the appropriate maximum EPR figure for the instantaneous temperature environment which is continuously monitored, and the output from this function generator is coupled through an appropriate logic and gating matrix 120 to the comparator means 22 mentioned previously. The output from the comparator 22 is coupled to the input 24 of a maximum EPR display and driver means, collectively designated 30, of the same basic nature as the display and driver means 130 for the air temperature environment, mentioned above. The structure and operation of the function generator 18 and 118, bridge network 115, and buffer or isolation amplifier 116 found illustrated and described in Philbrick's Researcher's, Inc. Application Manual for Computing Amplifiers (page 51) figure II.23, (page 102) figure III.80 (page 40) II.2 respectively. The structure and the operation of the logic and gating matrix 120 and 20 are found illustrated and described in Fairchild's Semi-Conductor Catalog (page 5–27) data sheet number SH3002.

As stated previously, the maximum allowable EPR is directly affected by the flight mode of the aircraft, and the system of the invention includes a flight mode select switch means 40 which provides an input to the system to effect modification of the EPR indication to be displayed, in accordance with the particular mode of flight. As graphically illustrated in the drawing, the flight mode select 40 comprises a manually operable switch element 42, having at least four different positions which, as indicated, reflect the four primary flight modes, consisting of takeoff, (including go around or inflight take off) climb, cruise, and continuous operation. The function of the mode select switch 42 is to provide a selectable input, via appropriate logic and gating matricies 20, and 120 of the configuration as set forth in Siliconix, Inc. catalog part number DG141L, to the comparator 22 for the maximum EPR display and driver means 30, such that the selected flight mode input varies the effective output from the comparator 22, to thereby bring about the desired change in the indicated maximum EPR display.

The operation of the flight mode select means 40 is also preferably combined with signals produced by the operation of the aircraft bleed air switches, indicated at 46. As will be recognized, jet-powered aircraft utilize compressor bleed air for a number of purposes, and the extent to which air is "bled" from the compressors directly affects the thrust output of the engine and its EPR. Consequently, an accurate and reliable instrument for the purposes of the invention should include appropriate inputs for modifying the displayed maximum EPR in accordance with bleed air usage, and such inputs may be provided directly from the aircraft bleed air switches, gated through the switching matricies 48. The bleed air signal ultimately affects the driver and display 30 which is in effect combined with the signal produced by the flight mode select means 40 mentioned previously.

Inasmuch as each particular type of jet engine in production and usage has its own particular set of EPR limits for the different modes of flight, and since engine and air frame manufacturers establish compressor bleed air requirements and limitations, each different type of aircraft will have its own particular requirements for the effect which flight mode and bleed air should produce on the certified or allowable EPR. Therefore, there is no single set of figures or design parameters for the flight mode select means 40 and the associated bleed air switch input 46 of the invention, and implementation of this circuitry for a particular engine and air frame application will be a matter of routine selection after contemplation of the present system. The same is also basically true of the specific elements or circuit configuration chosen to implement the function generation means 18 and 118. As will be recognized, proportional inputs of the type which the invention contemplates for the parameters of pressure and temperature are used in any number of conventionally-known devices, and the specific maximum or certified EPR values for particular altitudes and compressor inlet temperatures are specified by the engine manufacturers. Consequently, a useable function generator may easily be implemented through the use of non-linear "shaped" or "contoured" potentiometers, although it is felt that reliability and component and circuit efficiency will be maximized through the use of electronic function generation circuitry, which may involve biased diode networks in the input and feedback circuits of operational amplifiers or, even more preferably, operational amplifiers used as comparators to determine break points in the non-linear function to be generated, coupled to field effect transistor switches which select the input gain setting and the biasing resistors for a buffer amplifier. As a matter of electronic design per se, all of these approaches are known and can be practiced within the skill of the calling.

The instrument contemplated by the invention is intended to primarily provide a result in the form of a visually-readable display, preferably a digital display, which may be of the driven, rotatable-dial or drum type. Inasmuch as it is useful to know the TAT reading in flying the aircraft, a TAT readout display 150 is provided, as well as a maximum EPR display 50. As previously indicated, these digital readout displays are part of what has been termed a display and driver means, designated 30 and 130, respectively. Each such means includes an appropriate driver for the digital display itself, preferably a feedback servo system including a servo amplifier 32, 132, respectively, which drives a servo motor 34, 134, respectively, with the servo motor in each case mechanically coupled to the digital display to drive the same. Feedback or follow-up serve amplifier and motor drives of this type are, of course, in widespread usage at the present time, and units presently in use in aircraft attitude indicators are entirely suitable for use in the present system. In each of the servo drives, the feedback loop preferably includes a motor-driven follow-up device 36, 136, respectively for servo loop positioning. The actual calibration of the maximum EPR display should be in terms of conventional EPR units, while the TAT display should be in degrees centigrade.

Finally, an important aspect of the present system is in the capability of the output driver and display means 30, 130 to provide auxiliary outputs, such as may be used for automated control functions. This is illustrated in the drawing, wherein follow-up potentiometers 60, 160 are shown mechanically coupled to the servo motors 34, 134, respectively, for providing signals which will be directly proportional to the visually-displayed EPR limit and TAT indications. The value of such outputs will be readily apparent; the one corresponding to EPR max. limitation can readily be used in an automated engine thrust-controlling system if desired, as for example merely by coupling this output to a comparator receiving another input from the aircraft actual EPR indicator, with the error signal so obtained being used as the input for a driver which controls the engine power setting. In such a manner, completely automated engine control could be provided, and this could be manually selectable at any desired variable power setting. Of course, a manual override could be easily implemented, as normally would be desired.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

What is claimed is:

1. An engine pressure ratio limit indicator, comprising in combination:
    means for receiving signals which are proportional as processed by a buffer network to the pressure altitude of an aircraft in flight;
    means for receiving signals as processed by a bridge network which are proportional to the engine ram air temperature; and
    means connected to said first and said second mentioned means for producing an electrical output signal which is a function of the maximum allowable engine pressure ratio for the engine powering such aircraft at such pressure altitude and ram air temperature.

2. The instrument of claim 1, wherein said means for producing an electrical output signal includes a selectable input means for introducing a signal function from a flight mode selector representative of the flight mode of the aircraft, and wherein said output-producing means is structured to vary its output as a function of the selected flight mode of the aircraft.

3. An engine pressure ratio limit indicator comprising in combination:
    first input means for providing a signal proportional to the pressure altitude computed from an air data computer of an aircraft in flight;
    second input means for providing a signal proportional to engine ram air temperature provided by a ram air probe located near the engine compressor;
    function generating means for generating a pair of separate output signals from said first and said second input means signals, said output signals being representative of the maximum allowable engine pressure ratios for said engine mounted in said aircraft for the ambient pressure altitude and for the engine ram air temperature;
    comparator means for receiving said pair of output signals and selecting the signal representative of the lower of the maximum allowable engine pressure ratios, said selected output being coupled to an instrument output driver means for driving a desired display or the like.

4. The instrument of claim 3, wherein said output driver means includes a visual readout display calibrated in terms of maximum allowable engine pressure ratio.

5. The instrument of claim 4, wherein said output driver means includes a servo-type drive system for driving said readout display.

6. The instrument of claim 3, wherein said output driver means includes a pair of visual readout displays, one such display calibrated in terms of maximum allowable engine pressure ratio and the other in terms of air temperature.

7. The instrument of claim 3, wherein said output driver means includes an auxiliary control means for providing control signals to an automated engine controlling apparatus or the like.

8. The instrument of claim 3, including control input means for modifying the output signals from said function generating means in accordance with the flight mode of the aircraft.

9. The instrument of claim 8, wherein said control input means includes a selector switch means for selection of a predetermined one of several aircraft flight modes.

* * * * *